(12) United States Patent
Diedrich et al.

(10) Patent No.: US 11,983,655 B2
(45) Date of Patent: May 14, 2024

(54) METHOD, SYSTEM, AND MEDIA FOR MACHINE LEARNING ANNOTATION AND IMAGE MARKETPLACE USING BLOCKCHAIN LEDGERS

(71) Applicant: INTERNATIONAL BUSINESS MACHINES CORPORATION, Armonk, NY (US)

(72) Inventors: Karl Diedrich, Reading, MA (US); Marwan Sati, Mississauga (CA); Jennifer C Quattrone-Brown, Garland, TX (US); Mark D. Bronkalla, Waukesha, WI (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 17/249,209

(22) Filed: Feb. 24, 2021

(65) Prior Publication Data
US 2022/0270146 A1 Aug. 25, 2022

(51) Int. Cl.
*G06Q 10/0639* (2023.01)
*G06Q 30/0601* (2023.01)
(Continued)

(52) U.S. Cl.
CPC .... *G06Q 10/06395* (2013.01); *G06Q 30/0609* (2013.01); *H04L 9/3236* (2013.01);
(Continued)

(58) Field of Classification Search
CPC ........................................ G06Q 30/0601–0645
(Continued)

(56) References Cited

U.S. PATENT DOCUMENTS 10,452,813 B2  10/2019  Sorenson
10,643,105 B2   5/2020  Georgescu
(Continued)

OTHER PUBLICATIONS

Fred Ehrsam, Blockchain-based Machine Learning Marketplaces, Mar. 13, 2018 (Year: 2018).*
(Continued)

*Primary Examiner* — Marissa Thein
*Assistant Examiner* — Anna Mae Mitros
(74) *Attorney, Agent, or Firm* — Daniel J Blabolil

(57) ABSTRACT

A method, a computer system, and a computer program product for marketplace creation and model training in a blockchain network is provided. Embodiments of the present invention may include uploading images to a marketplace. Embodiments of the present invention may include recording references to the images on a blockchain ledger. Embodiments of the present invention may include measuring local and global annotations. Embodiments of the present invention may include determining an image quality threshold has been met. Embodiments of the present invention may include providing an annotation quality metric to the marketplace. Embodiments of the present invention may include pre-processing and standardizing the images. Embodiments of the present invention may include training a model. Embodiments of the present invention may include recording the model in the blockchain ledger. Embodiments of the present invention may include providing the model to the marketplace.

20 Claims, 6 Drawing Sheets

(51) Int. Cl.
*H04L 9/00* (2022.01)
*H04L 9/32* (2006.01)
(52) U.S. Cl.
CPC ............ *G06Q 2220/00* (2013.01); *H04L 9/50* (2022.05); *H04L 2209/56* (2013.01)
(58) Field of Classification Search
USPC ..................................... 705/26.1–27.2, 26.25
See application file for complete search history.

(56) References Cited

U.S. PATENT DOCUMENTS

| 10,679,011 | B2 | 6/2020 | Galitsky | |
|---|---|---|---|---|
| 10,748,650 | B1* | 8/2020 | Ricci | G06T 7/0014 |
| 11,250,937 | B2* | 2/2022 | Malvankar | H04L 9/3239 |
| 2019/0156241 | A1* | 5/2019 | Hughes | G06F 16/25 |
| 2020/0101367 | A1 | 4/2020 | Tran | |
| 2020/0218940 | A1* | 7/2020 | Anglin | H04L 9/0637 |

OTHER PUBLICATIONS

Disclosed Anonymously, "Clinical Content Categorization from Electronic Medical Records (EMRs) without Assignment of Codes", An IP.com Prior Art Database Technical Disclosure, IP.com No. IPCOM000245141D, IP.com Electronic Publication Date: Feb. 12, 2016, 15 pages.
Disclosed Anonymously, "Method and System for Providing Feedback Driven Assistance to Image Annotators", An IP.com Prior Art Database Technical Disclosure, IP.com No. IPCOM000256329D, IP.com Electronic Publication Date: Nov. 19, 2018, 4 pages.
Garg et al., "Method of Improving Accuracy for Object Detection in an Annotation System", An IP.com Prior Art Database Technical Disclosure, IP.com No. IPCOM000250868D, IP.com Electronic Publication Date: Sep. 11, 2017, 6 pages.
Honig et al., "Automatic Assessment of Non-Native Prosody—Annotation, Modelling and Evaluation", Jan. 2012, 11 pages.
https://www.deepradiology.com/, "DeepRadiology", Artificial Intelligence to Revolutionize Medical Imaging™, Accessed on Oct. 26, 2020, 4 pages.
https://www.grandviewresearch.com/press-release/global-data-annotation-tools-market, "Data Annotation Tools Market Size Worth $2.57 Billion By 2027", Data Annotation Tools Market & Growth Trends, Mar. 2020, 8 pages.
https://www.hoppr.ai/, "Bringing Data Sources & Consumers Together", Unleash yourdata & scale AI/ ML Development, HOPPR, Accessed on Oct. 26, 2020, 7 pages.
https://www.md.ai/, "The platform for medical AI", MD.ai, Accessed on Oct. 26, 2020, 5 pages.
https://www.mdw.io/, "Looking for Quality Radiologists to Assist With Your Growing Interpretation Needs?", To Find the Right Radiologist, Tell Us About Your Facility, MDW, Accessed on Oct. 26, 2020, 5 pages.
https://www.mdw.io/sell-images.html, "Looking to Monetize Images Stored in Your PACS or VNA?", MDW, Decentralized Radiology Marketplace, 2 pages, Accessed on Oct. 26, 2020.
Kompalli et al., "How Blockchain Could Solve Radiology's Problems", Dec. 5, 2018, 6 pages.
Mayfield et al., "Automating Annotation of Information-Giving for Analysis of Clinical Conversation", Copyright 2013 by American Medical Informatics Association, 9 pages.
Mitry et al., "The Accuracy and Reliability of Crowdsource Annotations of Digital Retinal Images", Article, TVST, 2016, vol. 5, Article 6, 9 pages.
Sarikaya, "How Blockchain Will Disrupt Data Science: 5 Blockchain Use Cases in Big Data", Jan. 5, 2019, 8 pages.
Synced, "Data Annotation: the Billion Dollar Business Behind AI Breakthroughs", Aug. 28, 2019, 14 pages.
Zhang et al., "Methods for Automating Image Annotation From Videos by Iterative Learning", An IP.com Prior Art Database Technical Disclosure, IP.com No. IPCOM000258032D, IP.com Electronic Publication Date: Apr. 1, 2019, 15 pages.
Mell et al., "The NIST Definition of Cloud Computing", Recommendations of the National Institute of Standards and Technology, Special Publication 800-145, Sep. 2011, 7 pages.

* cited by examiner

METHOD, SYSTEM, AND MEDIA FOR MACHINE LEARNING ANNOTATION AND IMAGE MARKETPLACE USING BLOCKCHAIN LEDGERS

BACKGROUND

The present invention relates generally to the field of computing, and more particularly to machine learning. Annotated images are limited by the number of images that are available to use for training a machine learning model. A limited number of images, based on variety or quality, significantly reduces the amount of training data for model learning and accuracy.

SUMMARY

Embodiments of the present invention disclose a method, a computer system, and a computer program product for marketplace creation and model training in a blockchain network. Embodiments of the present invention may include uploading images to a marketplace. Embodiments of the present invention may include recording references to the images on a blockchain ledger. Embodiments of the present invention may include measuring local and global annotations. Embodiments of the present invention may include determining an image quality threshold has been met. Embodiments of the present invention may include providing an annotation quality metric to the marketplace. Embodiments of the present invention may include pre-processing and standardizing the images. Embodiments of the present invention may include training a model. Embodiments of the present invention may include recording the model in the blockchain ledger. Embodiments of the present invention may include providing the model to the marketplace.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
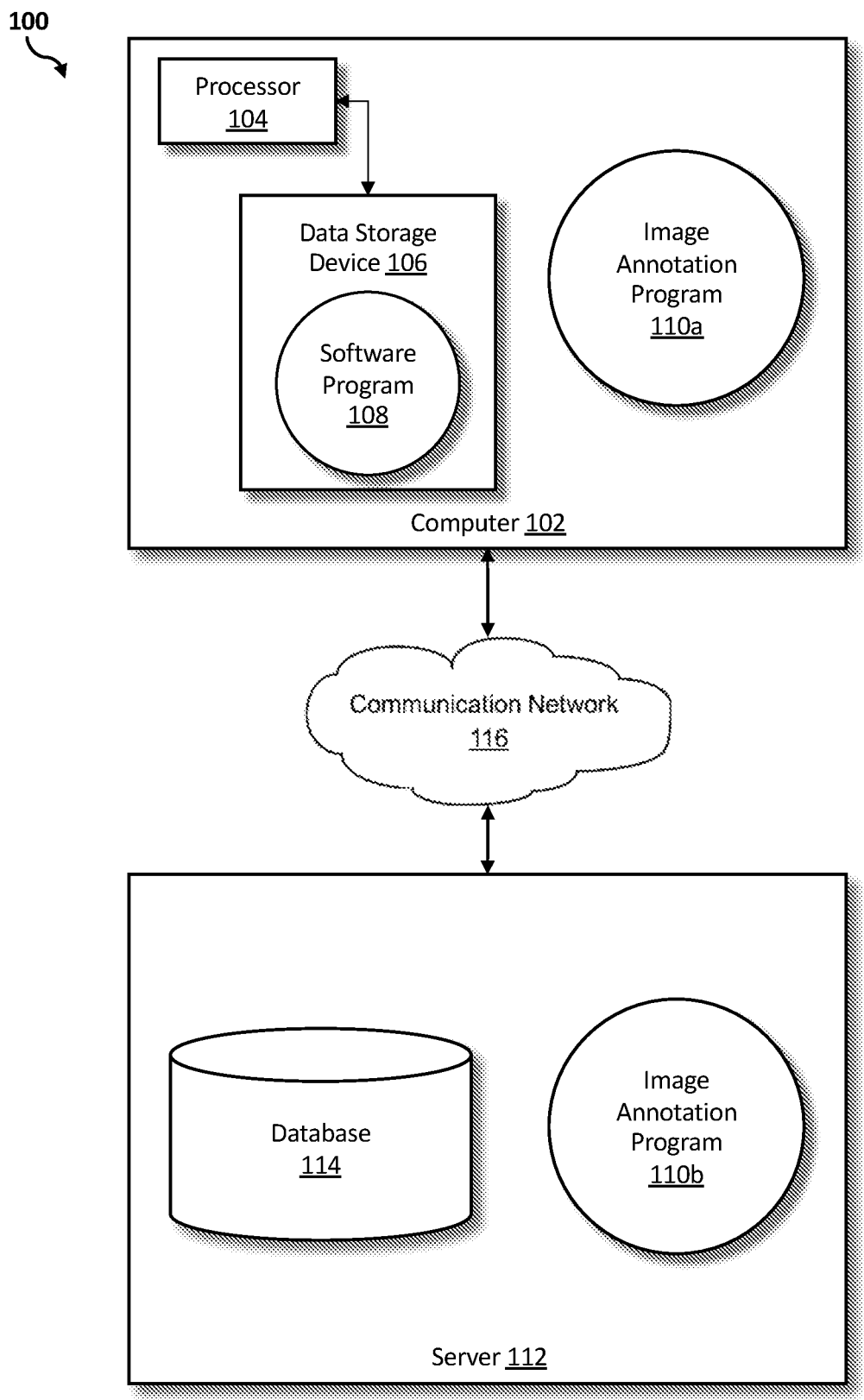
FIG. 1 illustrates a networked computer environment according to at least one embodiment.

Detailed embodiments of the claimed structures and methods are disclosed herein, however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, annotated images are limited by the number of images are available to use for training a machine learning model. A limited number of images, based on variety or quality, significantly reduces the amount of training data for model learning and accuracy. For instance, training a model with a limited quantity, quality and variety of images, such as radiology images for a medical practice group, will lead to less accurate and thus, less helpful, models in the medical domain.

The limited amount of training data available creates a low diversity of sources from which to obtain more images, produces low quality image annotations that can be created and inhibits model training and generalization for diverse real world clinical use. The lack of training data and tracing of the data can lead to contaminated model testing since a separate set of data may not be available for testing. The contaminated model testing may occur by using data during training iterations and producing models that do not generalize to diverse or unseen clinical data. Data limitations may also be due to image owners having reluctance to release images out of the image owner's control, and thus, limiting the numbers and the sources of images for model training.

Currently, many image annotators are paid once for an annotation for one model training project, which limits the incentive to improve annotation quality. Model trainers work with each individual provider which limits the number of sources the images can come from. Model trainers also contain limited knowledge of the quality of the annotations and the limited knowledge can significantly reduce the model trainers' control over the quality of the annotations. Also, images provided to model trainers in a federated training can prevent consistent pre-processing and manipulation of the diverse images to a single unified dataset. Federated training may include models that are trained at the image owner's sites without the images leaving the site.

Additionally, obtaining images to train models may be difficult, for example, in the radiology sector, due to the lack of widely available images and due to the privacy related to images. As an example, a radiology clinical practice can have an overwhelming workload leading to missed diagnoses findings and physician burnout. Leveraging machine learning models by training a model using supervised training with annotated radiology images can assist a clinical radiology practice. However, radiology images may be limited in the number available to train a model, in the quality of the images and in the variety of the images available for training. Therefore, it may be advantageous to, among other things, create a framework that incentivizes the intake or release of more images and to create a model that annotates and increases the quality of predictions.

The following described exemplary embodiments provide a system, a method and a program product for machine learning. As such, embodiments of the present invention have the capacity to improve the technical field of machine learning by creating a model that annotates images and improves the quality of the annotations. More specifically, the quality of the annotations is improved by obtaining higher quality training data, by tracing data use on a blockchain ledger and by providing an incentivized marketplace for buying and selling image and annotation data for model training. More images for model training produce an increase in the quality of machine learning models that can be useful for various domains and industries, such as the medical industry.

According to an embodiment, annotation data may be collected and created from training artificial intelligence agents. An artificial intelligence agent or a learning agent in artificial intelligence may have learning capabilities based on previous experiences. A learning agent may begin with basic knowledge and then adapt automatically through machine learning. By measuring and segregating artificial intelligence agent training data, particular expertise may be provided. For example, in a medical use case, some annotators may have expertise and specialties associated with the annotator's medical experience, such as expertise by body part, by subject age or by disease diagnosis. Data and annotations, such as images and annotations associated with the images as ground truth, are gathered or received as input data from multiple sources. The sources may include, for example, image owners, image repositories, data collections, resource centers, resource brokers, research centers, data centers or data repositories.

The input data and annotations may be used as machine learning training datasets and testing datasets to train one or more machine learning models. Annotations may include data provided for use during machine learning or artificial intelligence training. Annotation data may include, for example, metadata or a summary of the annotation or a conclusion of the resulting data input data. Annotation objects may include, for example, dimensions, notes, or other types of explanatory symbols or objects that are commonly used to add information to a drawing. The datasets may be preprocessed consistently. Consistent preprocessing of datasets may provide a consistent baseline to allow uniformity.

According to an embodiment, the received data may be stored, and the models may be trained on secure cloud object storage servers, nodes, databases or containers. The cloud object storage architecture may be used to ensure that data owners, such as image owners, remain in control of the owned data and reduce the reluctance in providing data for model training. Users, such as annotators or model trainers may not have the ability to download and share the data in the marketplace. A use case example may include training models to annotate the images to predict medical diagnoses. The annotation quality of the received data may be automatically measured, such as using specific measures used for medical radiology images.

According to an embodiment, references to images and annotations that meet a quality threshold may be recorded in a blockchain ledger. Images and annotation objects may be encrypted on a cloud object storage and the references to the images may be kept and stored on the blockchain network to allow for fast and secure tracking. An immutable audit trail in the blockchain ledger and the uniqueness of the images may be used to prevent contamination of model testing and clinical trials with training data (i.e., training data and testing data will not overlap). Separating the data allows for unambiguous irrefutable tracking of the references to the objects on the cloud object storage in a blockchain network. The training data may assist models to generalize to unseen data in clinical use. For example, training data may be used to identify and group together unseen data and may begin to group together previously unseen data and data patterns, allowing for deeper data insights and model learning capabilities.

According to an embodiment, smart contracts may be used with the blockchain network to tie or connect the set of images and annotations to particular image owners, annotators or model trainers. Additionally, the smart contracts may be used to tie or connect the set of images in an online marketplace.

According to an embodiment, annotation and annotator quality may both be measured and published in a marketplace for model trainers to view or have access to before purchasing. The ability to view the quality of the annotations before purchasing the annotations may drive prices in the marketplace of the input data. In addition to the annotations, images may also be viewed for quality before purchasing. For instance, the market or marketplace can reward higher quality training data and higher quality annotations with higher prices. For example, annotation quality may be measured using ground truth or using the Dice coefficient, the simultaneous truth and performance level estimation (STAPLE) or the Hausdorff dissimilarity distance. Model trainers may also purchase images and annotations from a diverse set of image owners or image providers based on the quality of the data. Annotators may generalize and improve the training sets and the models, which provides models or results in models that are applicable to a wider range of uses, such as a wider range of clinical uses.

Measuring the quality of the input data, such as the image annotation quality, may allow a ranking of the annotators in the marketplace such that the higher quality training data can be rewarded. Quality scores may be given to annotators for different annotation tasks to measure the annotators strongest specialties where they produce the most valuable annotations to a marketplace for training data purposes. Quality scores, for example, may be provided as background data or as metadata and may be grouped from the rankings. The rankings may be analyzed over a period of time, for example, when an annotator is identified as being consistent with the provided annotations, when an annotator has a specific specialty or when an annotator consistently provides a similar level of annotations as the annotator's high ranking peers. The ranking may allow for a normalization of higher quality data. The data quality may also allow the input data and annotation data to be separated for a training dataset or a training data group and a testing dataset or a testing data group.

According to an embodiment, machine learning is used to train and test models with images such as medical image data, x-rays or pictures using a camera. Various types of machine learning models may be built and used to create predictive results for medical diagnosis by annotating images. Data or information from domains other than the medical industry may be used to provide predictive results for image annotations. Other domains may include, for example, research, compliance, safety data, pharmaceutical, manufacturing, quality testing, retail, entertainment, social media, business, technology, medical, academic, government, industrial, food chain, legal or automotive.

Machine learning models may include, for example, artificial intelligence models, deep learning models, neural networks, artificial neural networks (ANNs) and regression models. Deep learning may also be related to or known as hierarchical learning or deep structured learning. The term model may be used to indicate various types of machine learning models, such as a deep learning model, a neural network model, a trained model, an attention-based model, a classification model, a regression model or a decision tree model.

Training, testing and updating a machine learning model may include supervised, unsupervised and semi-supervised machine learning procedures. Supervised learning may use a labeled dataset or a labeled training set to build, train and update a model. Unsupervised learning may use all unlabeled data to train a model. Semi-supervised learning may use both labeled datasets and unlabeled datasets to train a model. Supervised learning and semi-supervised learning may incorporate feedback or ground truth by having an individual check the accuracy of the data, data labels, annotations and data classifications. Individuals may typically include a subject matter expert who has extensive knowledge in the particular domain of the dataset.

Individuals may also include model trainers, users, domain specialists or administrators. For example, a subject matter expert input may represent ground truth for the machine learning model and the provided ground truth may raise the accuracy and the predictive capabilities of the model. The subject matter expert may correct, amend, update or remove the classification of the data or data labels by manually updating the labeled dataset. Using a subject matter expert to provide feedback to the model may improve the accuracy of the model as datasets are updated or corrected.

Experts may provide input or feedback into a model by altering the training set as opposed to an unsupervised machine learning environment, when a user may not provide input to the data. The training set of data may include annotation parameters or a classification label for learning purposes and a supervised or semi-supervised machine learning environment may allow the user to update the labels or classifiers of the training set. As an example, a local ground truth annotation in radiology images may highlight a portion of the image to train models to create one or more bounding boxes predictions to cover the highlighted portion of the image. Diagnostic models may be trained by using one or more global diagnostic predictions.

Cognitive analyses, such as natural language processing (NLP) and semantic analysis, may be used during the building and training of a model. The cognitive analytics may analyze both structured and unstructured data to be incorporated into the machine learning (ML) process. Natural language processing (NLP) may be used to analyze the quality of data or feedback that is received for training and model building. Structured data may include data that is highly organized, such as a spreadsheet, a relational database or data that is stored in a fixed field. Unstructured data may include data that is not organized and has an unconventional internal structure, such as a portable document format (PDF), an image, a presentation, a webpage, video content, audio content, an email, a word processing document or multimedia content.

The received data may be processed using natural language processing (NLP) to extract meaningful information for training and building a model. Semantic analysis may be used to infer the complexity, meaning and intent of the information or data received. Semantic analysis may also consider syntactic structures of information at various levels to infer meaning to words, phrases, sentences and paragraphs of the received, collected or extracted data. The cognitive analyses may, for example, be used to produce reports or extra data that may be included with the imaging data for correlation.

According to an embodiment, a marketplace is created by building an online transactional location website or an online store that facilitates the purchasing and selling of data that has been collected. The marketplace may be considered an annotation marketplace or a training marketplace. The marketplace may be used to incentivize an increase in the number of images available to annotate and to have a greater variety of conditions shown in the images. An annotation market or marketplace may be subdivided into multiple minimarkets, for example, in the medical domain by creating minimarkets based on the body part x-ray image or images. Creating minimarkets may reduce the size of the blockchain required. The reduction in size may be accomplished by reducing the size of the ledger required when the market and ledger are broken down into smaller sub-markets or minimarkets.

According to an embodiment, a blockchain network is used to create a secure computing environment for the images, many of which may include sensitive material. Blockchain technology may include a shared log of events that are kept in blocks of data that may be passed to the next transaction in a linear order. A block may contain the data of one or more records or transactions. A block may hold or store the data before the block has been completed, prior to consensus and prior to being transferred to the next block in a blockchain, for example, using a transaction pool, a memory pool or a candidate block. A block may also be a block of one or more records or transactions attached to a blockchain, for example, a transaction that has been permanently appended and recorded to the files in a blockchain. Additionally, smart contracts may be used in a blockchain network and may allow particular permissions to access, write to or control the flow of data.

With blockchain technology, for example, when a transaction is written into a ledger, there may be a mechanism to ensure all the records are synchronized and if the blockchain network detects an error, the error may be immediately corrected. Blockchain technology allows transactions using the input data and the annotations to be safely and securely executed in the online marketplace with customers or users, such as annotators and model trainers. Blockchain systems are immutable since, for example, a hash value on each block may be created and any change or amendment in data will show a different hash value. Each block may contain the hash of the previous block and the current transactions before the next hash may be created. Once consensus is reached, the data may be verified. Each block may have a hash value of the previous block in the chain and there may be no way to modify the data in the previous block. If the data is modified, the modified data may be detected by a re-calculated hash value. A different hash value may show that the blockchain network has been compromised.

Open source software projects can advance blockchain technology by enabling various businesses and industries to identify and use blockchain technology features. Some challenges related to the advancement of blockchain technology may include accessibility to a blockchain and controlling sensitive personal information (SPI). Hyperledger is an open source project to leverage blockchain technology. Hyperledger is a collaboration between many industry leaders to use blockchain technology for various businesses or industries. Blockchain technology may be used for a network system to have consensus, authenticity, immutability and finality of the logged events. Hyperledger may use various software developing resources to create platforms that may support blockchain technology.

Cloud object storage or cloud object storage servers may include a cloud storage that can store unstructured data. Cloud object storage may manage the unstructured data as objects and may also use a container-based architecture. Containers or container-based architecture may include isolated infrastructures that use a minimal amount of resources, share a host operating system and are simple to integrate. Containers also allow for minimal software configuration since the container may use, for example, the same software code in a delivery pipeline. A differing container may operate within a same microservice framework and may operate on an alternate software code with minimal configuration. An application program interface (API) may include a set of functions or a communication protocol that allows, for example, the container to access data on a cloud computing environment, a virtual machine, an operating system, a service or an application.

Referring to FIG. 1, an exemplary networked computer environment 100 in accordance with one embodiment is depicted. The networked computer environment 100 may include a computer 102 with a processor 104 and a data storage device 106 that are enabled to run a software program 108 and an image annotation program 110a. The networked computer environment 100 may also include a server 112 that is enabled to run an image annotation program 110b that may interact with a database 114 and a communication network 116. The computer 102 may also be known as a client computer and the server 112 may also be known as a server computer. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The computer 102 may communicate with the server 112 via the communications network 116. The communications network 116 may include connections, such as wire, wireless communication links, or fiber optic cables. As will be discussed with reference to FIG. 4, server 112 may include internal components 902a and external components 904a, respectively, and computer 102 may include internal components 902b and external components 904b, respectively. The server 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the image annotation program 110a, 110b may interact with a database 114 that may be embedded in various storage devices, such as, but not limited to a computer/mobile device 102, a server 112, or a cloud storage service.

According to the present embodiment, a user operating a computer 102 or a server 112 (e.g., a server computer) may use the image annotation program 110a, 110b (respectively) to annotate images within a marketplace using a blockchain network. The image annotation method is explained in more detail below with respect to FIGS. 2 and 3.

Figure 2:
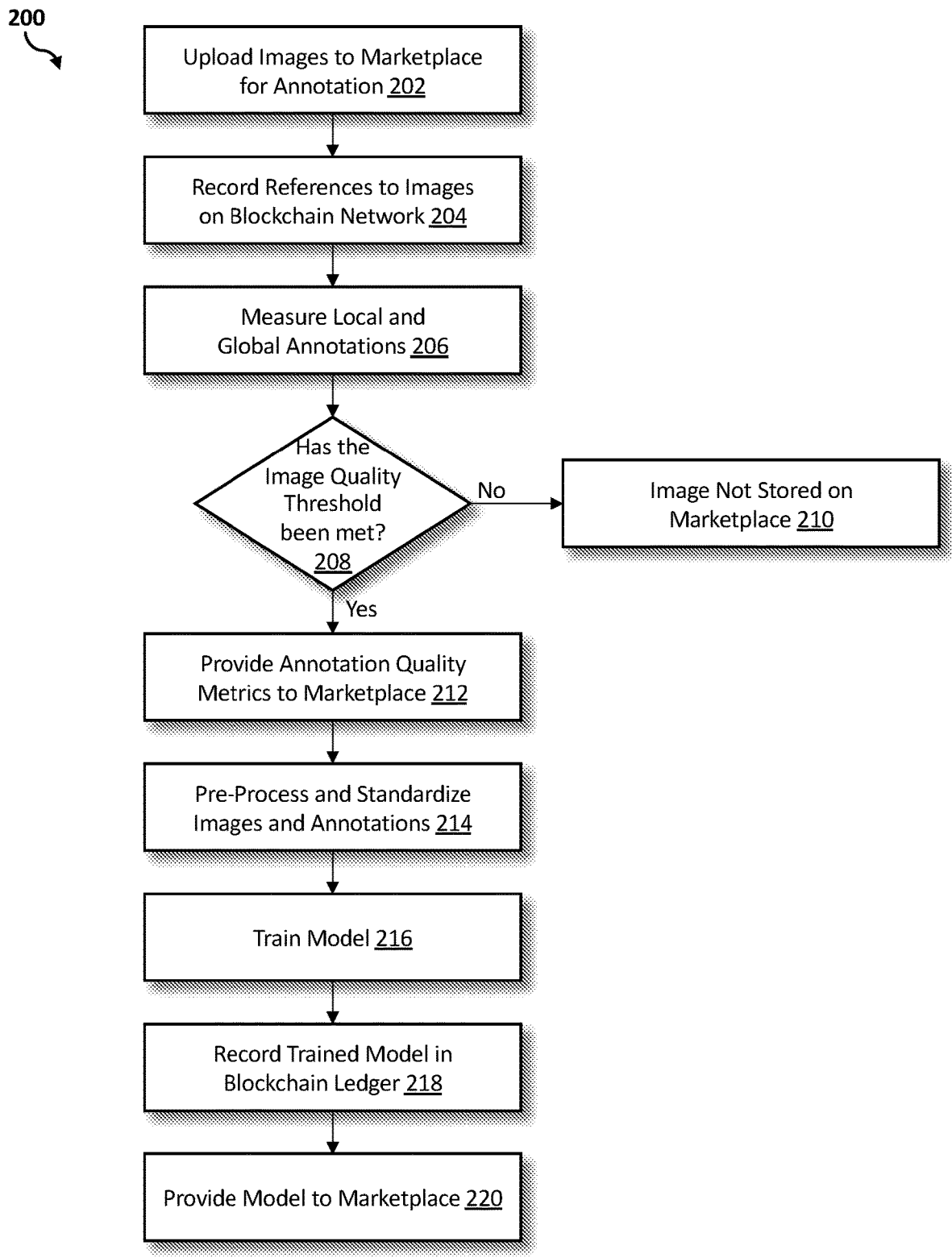
FIG. 2 is an operational flowchart illustrating a process for marketplace creation and model training in a blockchain network according to at least one embodiment.

Referring now to FIG. 2, an operational flowchart illustrating the exemplary marketplace creation and model training in a blockchain network process 200 used by the image annotation program 110a, 110b according to at least one embodiment is depicted.

At 202, images are uploaded to a marketplace. Images are uploaded to the marketplace for annotation. Images may be uploaded from various sources, such as a server, a database site or location, a data pool, a service or any source that is capable of providing images and relevant data related to the images. For example, an image owner uploads an image to a secure cloud object storage server. Images may be uploaded in many different formats, such as DICOM, XDS, PDF, AVI, Bitmap, HTML, HL7 or XML.

For example, deidentified images are uploaded to the cloud object storage server and automatically encrypted with a fingerprint to ensure uniqueness on the cloud object storage server nodes. A fingerprint may include, for example, a private key and a unique identifier. The uniqueness may be ensured by having the fingerprint encrypted to the image to prevent duplication of data for training datasets and testing datasets. The deidentified images may comply with general data protection regulations (GDPR) by, for example, storing images in the cloud as a target and then having the ability to delete the target upon request. The deidentified images may also allow the blockchain to be quick to update by only recording and referencing the target and allowing the data to be deleted from the target as necessary.

The image providers may also upload ground truth evidence with the image to increase the accuracy or value of the image. For example, an image owner uploads a in image with the ground truth data, such as pathology data and clinical history data with the image. The ground truth data or the pathology data may be dynamically added to the image data to increase the value.

Images are uploaded to the marketplace for the purpose of allowing transactions, such as buying and selling access to images, annotations or expertise between the users in a secure network. The marketplace may include a market that is managed by a blockchain ledger with smart contracts. One image may be used or annotated for multiple different applications. For instance, an image owner uploads an image and provides unlocking keys for access to image data. The unlocking keys may be provided to users in the marketplace, such as image owners, image annotators and model trainers through smart contracts managed by a private blockchain ledger.

The blockchain ledger may manage the purchases and the sales or the financial transactions between the marketplace users. For example, blockchain is used for monetary transactions between users of the marketplace. For distinguishing purposes, users of the marketplace and model training may include image owners or owners, images annotators or annotators, model trainers or trainers, service or data providers or providers, administrative users or company or client users for particular domains.

At 204, references to images are recorded on the blockchain network. The blockchain network includes a blockchain ledger to process and record the image transactions of buying and selling. The references to the buying and selling within the marketplace may be stored in the blockchain and the record of who has accessed the reference information may also be stored. The blockchain ledger may be used for transactions between users, such as owners, providers, annotators and trainers. References to the images may include, for example, ownership of images, accesses to images and annotations. The references may be recorded in the blockchain ledger based on the smart contract and the ledger may provide an immutable audit trail of accesses to the images, the ground truth and the annotation data.

The blockchain ledger may record references to the encrypted images on the cloud object storage server nodes or the cloud server nodes, the ownership of the images and the access to the images. The access to the images may include viewing the images, using the images for model training, or using the images for model testing.

The images that are encrypted on cloud server nodes may also be deleted if required by GDPR. If an encrypted image is deleted from the cloud server node for any reason, the encrypted image would disable the image references in the private blockchain ledger. The private blockchain ledger, such as Hyperledger, may be used to enable feedback with a faster response time than a public blockchain ledger.

At 206, local and global annotations are measured. Images are locally annotated under the image owner's control on the secure cloud object storage server. For example, an image annotator can annotate a de-crypted image using a zero client viewer server from the cloud object storage server without downloading the image locally. A zero client viewer server may be a browser agnostic program that allows for images to be reviewed on any computing device or computing station, for example, without requiring additional software. Images are also globally annotated under the image owner's control. An image remaining under the image owner's control for local annotations may refer to, for example, the user or the annotator or the model trainer having the ability to view the image in a zero footprint viewer without downloading the full resolution image to the user computer. The image owner may have the ability to determine the use and the accessibility of the image. For example, the marketplace allows the person who uploads an image to determine what the image may be used for, if the image should be private or public, and who may gain access to the image to view the image from a zero footprint viewer.

Local annotations or local annotation parameters may refer to measuring quality, for example, with the Dice coefficient, the simultaneous truth and performance level estimation (STAPLE) algorithm or the Hausdorff dissimilarity distance. For example, the quality measure may overlap between ground truth provided by an expert versus an algorithm generated detection of a lesion or a tumor. Local annotations may be measured or calculated by, for example, the tasks that the annotators provide that may have the most value from the quality measures, such as local lesion contour annotations, pathology significance, image differences or anomalies.

Global annotations or global annotation parameters may refer to measuring the quality of the image based on, for example, inter-rater reliability. Inter-rater reliability may include the ability to compare peer to peer quality for consistency to ensure that images are being interpreted at a higher quality, a higher quality as ranked by the annotator. Global annotation quality may be measured, for example, by an evaluation of a pathology. Global annotations are measured or calculated by, for example, the annotator reviewing the image and determining the corresponding annotation.

The global diagnostic and the local lesion contour annotations may be saved and encrypted with a unique fingerprint on the cloud object storage server. Additionally, the annotation data or the annotation ownership data may be recorded in the blockchain ledger.

The image annotation program 110a, 110b determines if the image quality threshold has been met at 208. The image quality determined at step 208 may be measured by, for example, comparing the model algorithm output with the expert generated ground truth diagnosis and contours of lesions or tumors. The image quality threshold or the threshold may be set based on set parameters, such as a percentage of the inter rater reliability, the number of images or the Dice coefficient. The purchaser, the requestor or the image owner may choose the threshold or create a filter or a pre-determined threshold.

For example, the quality threshold is set at the beginning of the request for a dataset, when a user or a marketplace customer is searching for the dataset or when the information and images are uploaded to the marketplace. The quality threshold, as an example, is set by the local annotation parameters, by the ranking or by the inter rater reliability being at a predetermined or at a specified percentage. For example, if the inter rater reliability is at a specified percentage, and the contours are aligned at a specified location, then a quality threshold has been met based on the specifications.

For example, annotations have to meet multiple medically relevant quality thresholds before the annotations can be recorded in the ledger. Quality measures may provide individual annotator and systemic feedback or marketplace feedback to improve the annotations and the data quality for model training purposes.

If the image annotation program 110a, 110b determines that the image quality threshold has not been met at 208, then the image may not be stored to the marketplace as a quality image at 210.

If the image annotation program 110a, 110b determines that the image quality threshold has been met at 208, then the annotation quality metrics are provided to the marketplace at 212. The annotation quality metrics may be available to users in the marketplace, such as model trainers. For example, the model trainers can view the annotation quality metrics before purchasing the annotated images or before selecting the image or annotation for model training purposes.

Marketplace users may see the quality metrics of the user's own annotations and images that the user submits or that the user purchases. For example, annotators may view or see what tasks the annotators provide that may have the most value from the quality measures. When the annotator logs into the marketplace with a username and password, a list of items will appear as a list of items that are ready to be reviewed by the annotator. The list may be filtered to show the annotator which tasks the annotators provided that may have the most value from a quality measure standpoint. The quality metric controls may be provided by rights and privileges associated with the quality data or based on the use of access granted depending on the marketplace user role.

The quality metrics or quality measures may be published in the marketplace. Quality measures may be published in multiple ways, such as via a summary report, published in a database or in the metadata, or stored as a private tag in DICOM format. For example, model trainers can see the metrics on an annotator and the annotation quality before purchasing the annotated images. The metrics allow control over the quality of the marketplace data and the quality may determine market prices of the marketplace data. For example, higher market prices are determined for higher quality of image and annotation data and lower market prices are determined for lower quality images and annotation data.

The annotations that have met the quality threshold or the quality thresholds may be saved and encrypted in the cloud object storage server and the annotations associated with the image may be referenced in the blockchain ledger. Data meeting the determined quality thresholds, such as the image, the annotation, the ground truth or the long term diagnosis, may be added and recorded to the blockchain ledger for availability in the marketplace. The data may be recorded to the blockchain as a record of, for example, who annotated the image and who uploaded the image.

At 214, the images and the annotations are pre-processed and standardized. For example, an image may be normalized before the image is passed to the model. The pre-processing may include, for example, the images that have been annotated or that the image data and annotations have been reviewed. The standardization may include, for example, the results in a quality uniform group of images or annotations. The images, the annotations or the images with annotations may be provided in the marketplace by multiple sources, such as image providers or image sources. The images and the annotations may be pre-processed and standardized together or separately. For instance, image and paired annotations from multiple image providers and annotators are pre-processed as a single consistent model training dataset.

At 216, one or more models are trained. Model training is executed on the cloud object storage. The cloud object storage database or server may provide the model trainers with the ability to view the images during model training to better understand errors that may have been made during training and by trained models. The access to the images during model training may be required for model trainers to debug the model. Model training may be executed by users, for example, model trainers. The model trainer may purchase the image or the annotations, or both. For example, model trainers can purchase an image with the paired image annotations and the purchase is facilitated via a smart contract. The image with the paired annotations may be considered part of a dataset that can be used to train or test a model. The price of the dataset may vary or be based on the consistency within the dataset. The price of the dataset may also vary or be based on the ratings or rankings of the annotations and annotators of the dataset. The smart contract may be managed on a private blockchain from image providers and annotators. Model trainers may view individual images and annotations using a zero client viewer so the model trainer may understand the image and annotation data for model debugging, training and testing purposes.

A model trainer may train and test a model using the image data and the annotation data on the cloud object storage server. The results of the model training may be stored, by the model trainer, by uploading to containers the model training code to secure server notes that can and do execute training and testing within the confines of the smart contracts. The model training code may be stored in a self-contained package that is equipped with the complete computing environment required to train models in a cloud environment. The secure server notes or the secure notes on the server may only be accessible based on permissions.

In addition to training a model, model trainers may provide feedback to annotators based on obtaining information of systematic failures and may provide instructions to annotators to increase the quality of the annotation tasks for model training purposes. The feedback may assist annotators in improving performance.

At 218, the trained model is recorded in the blockchain ledger. The trained model may be recorded in the blockchain ledger with a link to the image in the cloud object storage or the cloud object storage database. The model trainer may upload one or more digitally signed containerized images with the model training data and testing code. Model training data may include, for example, the images or image data and the annotations or annotation data. Testing code may include, for example, algorithms, data analytic processes or additional analysis executables. The reference point created at step 204 may point to the containers stored on the cloud server or may point to information stored directly on the blockchain.

The cloud object storage may be on a cloud object storage database or server and may provide an immutable audit trail of data used that is recorded in the blockchain ledger. The blockchain ledger may be used to select data for model testing and clinical trials that may not have been used for model training or for testing, for example, in clinical trials. The ability to utilize the data that may not have been used for training may assist in developing models that can generalize better to unseen data. For example, the image annotation program 110a, 110b may review the ledger and identifying which items have or have not been used before and may include or exclude any of the data points or data sets.

The smart contract may execute, on the private blockchain nodes, the release of the keys to unlock or to decrypt the images and the annotations to the cloud object storage server node or container allocated to the model trainer. The smart contract may also execute, on the model trainer's container, the decrypted image and the annotation data on a server node using a published application program interface executing the model training or the model testing. For model testing, the resulting data (i.e., information that is released from the model or the model output) may be checked against or compared to the immutable blockchain ledger to ensure no training data has been used for testing or in clinical trials.

The image data and the annotation data may be curated or organized in the marketplace based on a strength or based on a similarity or degree of concurrence of individual annotations that are ranked. For example, annotators who perform the same set of annotations are ranked so that model trainers can view the annotations being purchased. The model trainers may view if the annotations being purchased are from a higher purchase price from high ranked experts or from lower purchase prices from lower ranked users or crowd sourced users.

Annotators may receive feedback, in the marketplace, based on the quality of the annotations provided. For example, the feedback may be based on a disease or an anatomy, to improve the annotator's skill and for the annotator to know what tasks they provide generate the highest value annotations for the marketplace. Additionally, as an example, annotators may be paid per hour on a one-time basis by an annotation owner so the annotation owner can maintain ownership of the annotation for multiple resales of the annotation data. As another example, annotators may be paid by the usage of the annotations provided such that the annotation, sold in the marketplace, can provide a rate back to the annotator based on the quality of the annotation.

At 220, the model is provided in the marketplace. The model may be available to be purchased or bought through the marketplace. The model may be provided in the marketplace with one or more images, one or more annotations, or both. The model price may be determined by the data quality. Any user that has accessibility and proper permissions to the marketplace may purchase the model, the image or the annotations. Data quality may be enhanced over time as more annotators converge on ground truth annotation.

Figure 3:
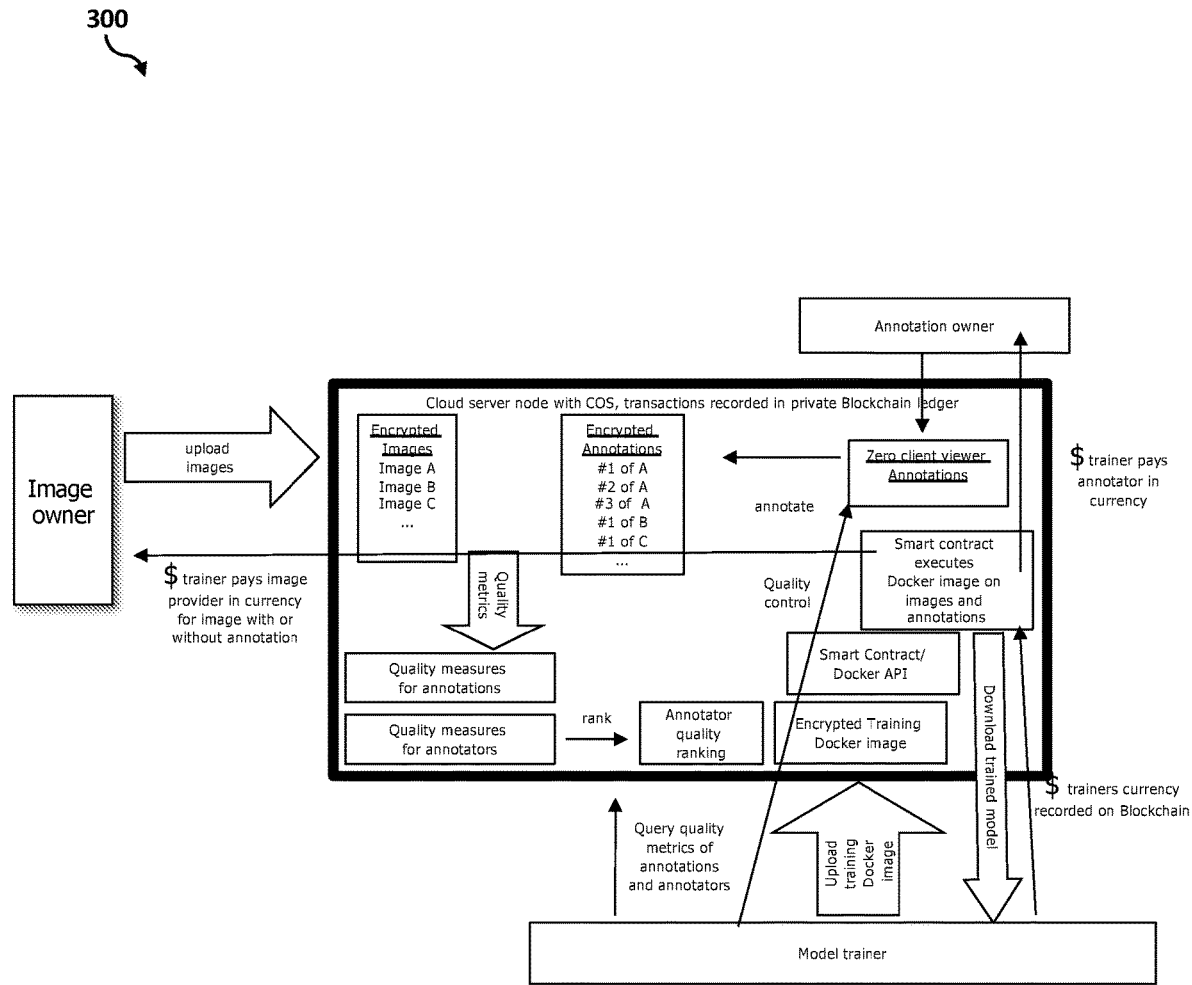
FIG. 3 is a block diagram example of the marketplace operation and model building in the blockchain network according to at least one embodiment.

Referring now to FIG. 3, a block diagram example of the marketplace operation and model building process 300 in a blockchain network used by the image annotation program 110a, 110b according to at least one embodiment is depicted. The marketplace operation and model building process 300 may provide a detailed example of the dynamic nature of the image annotation program 110a, 110b.

The image owner can upload images to the cloud server node with a cloud object storage. The images are uploaded to the cloud server node with transactions recorded in a private blockchain ledger that is stored in the cloud. The images and the annotations are encrypted, such as images A, B and C. The annotations may be added to the cloud marketplace after the images are uploaded, for example, annotations 1-3 of A, 1 of B and 1 of C based on uploading images A, B and C. Quality metrics may be measured for the annotations and the annotators may be ranked based on quality. Annotators and model trainers may view the annotations before purchasing them using a zero client viewer. If an annotator or a model trainer would like to make a purchase using the marketplace, the transactions are recorded in a private blockchain ledger. The annotator may purchase the image with or without annotations.

Smart contacts may be used to execute the transactions using docker containers Docker® containers (Docker and all Docker-based trademarks and logos are trademarks or registered trademarks of Docker, Inc. and/or its affiliates) and Docker® application program interfaces. Once a model is trained using the image or the annotations or both, the trained model may be provided for sale or as a purchase and recorded in the blockchain ledger. The images and the models may be available in the marketplace once they have been provided with a quality ranking that meets specific metrics or quality measures. The marketplace allows users to purchase models and images that are of a specified quality metric.

As the use case example may include training models to annotate the images to predict medical diagnoses. For example, an annotation marketplace for mammogram images and radiologist annotators is used to annotate global diagnostics and local contours of cancerous tumors on cloud object storage server nodes in a zero client viewer. IBM's® RapidDev IBM® containers (IBM and all IBM-based trademarks and logos are trademarks or registered trademarks of International Business Machines Corporation and/or its affiliates) may be used to develop training containers to train models on annotated images and to develop models for identifying negative cancer cases from mammograms on the cloud object storage server node. The trained models may then be tested in the containers using testing image datasets against or compared to the ground truth stored on the cloud object storage server nodes.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
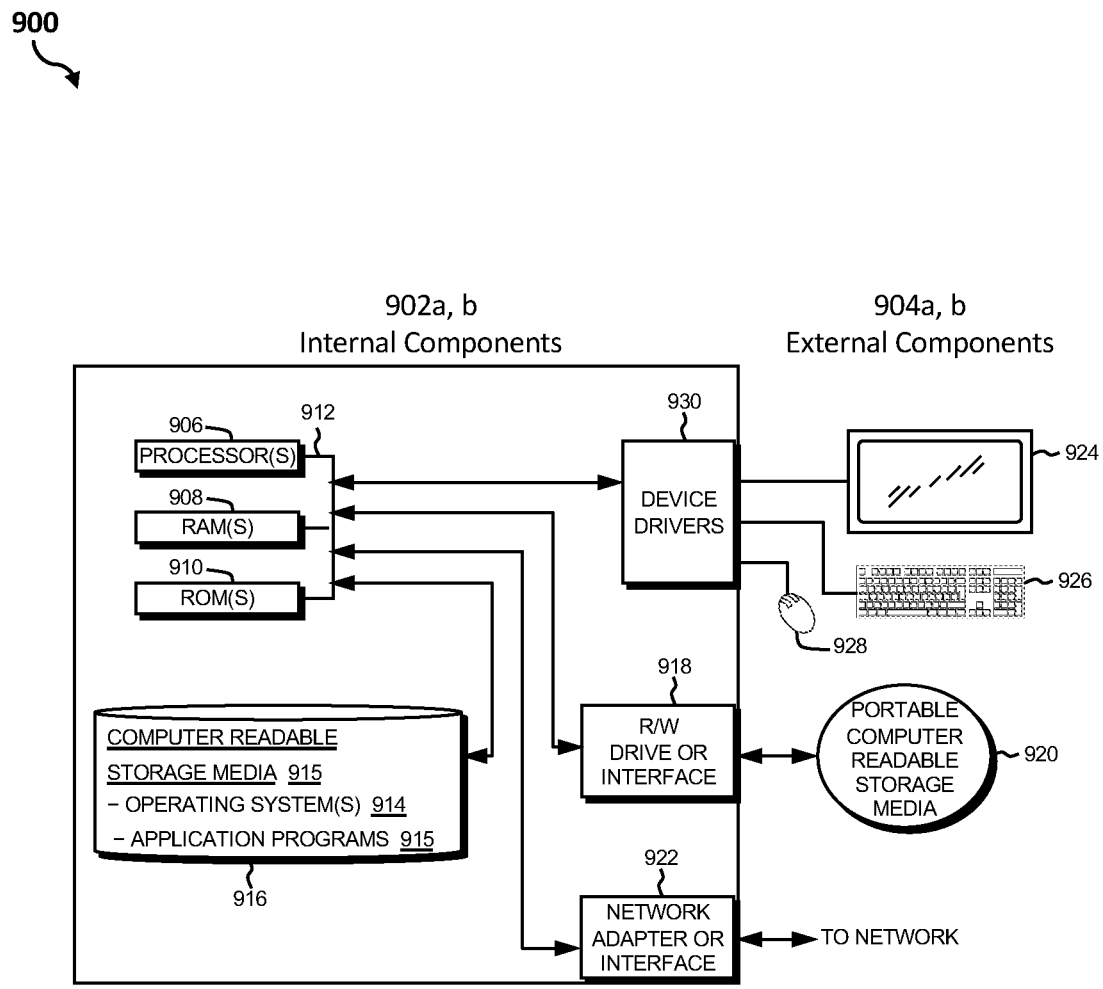
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computer 102 and server 112 may include respective sets of internal components 902 a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914, with one or more application programs 915 and one or more computer readable storage media 915. The one or more operating systems 914, the software program 108, and the image annotation program 110a in client computer 102, and the image annotation program 110b in network server 112, may be stored on one or more computer readable storage media 915 for execution by one or more processors 906 via one or more RAMs 908 (which typically include cache memory). In the embodiment illustrated in FIG. 4, each of the computer readable storage media 915 is a magnetic disk storage device of an internal hard drive. Alternatively, each of the computer readable storage media 915 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the image annotation program 110a, 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G/4G/5G wireless interface cards or other wired or wireless communication links. The software program 108 and the image annotation program 110a in the computer 102 and the image annotation program 110b in a network server 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the image annotation program 110a in computer 102 and the image annotation program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
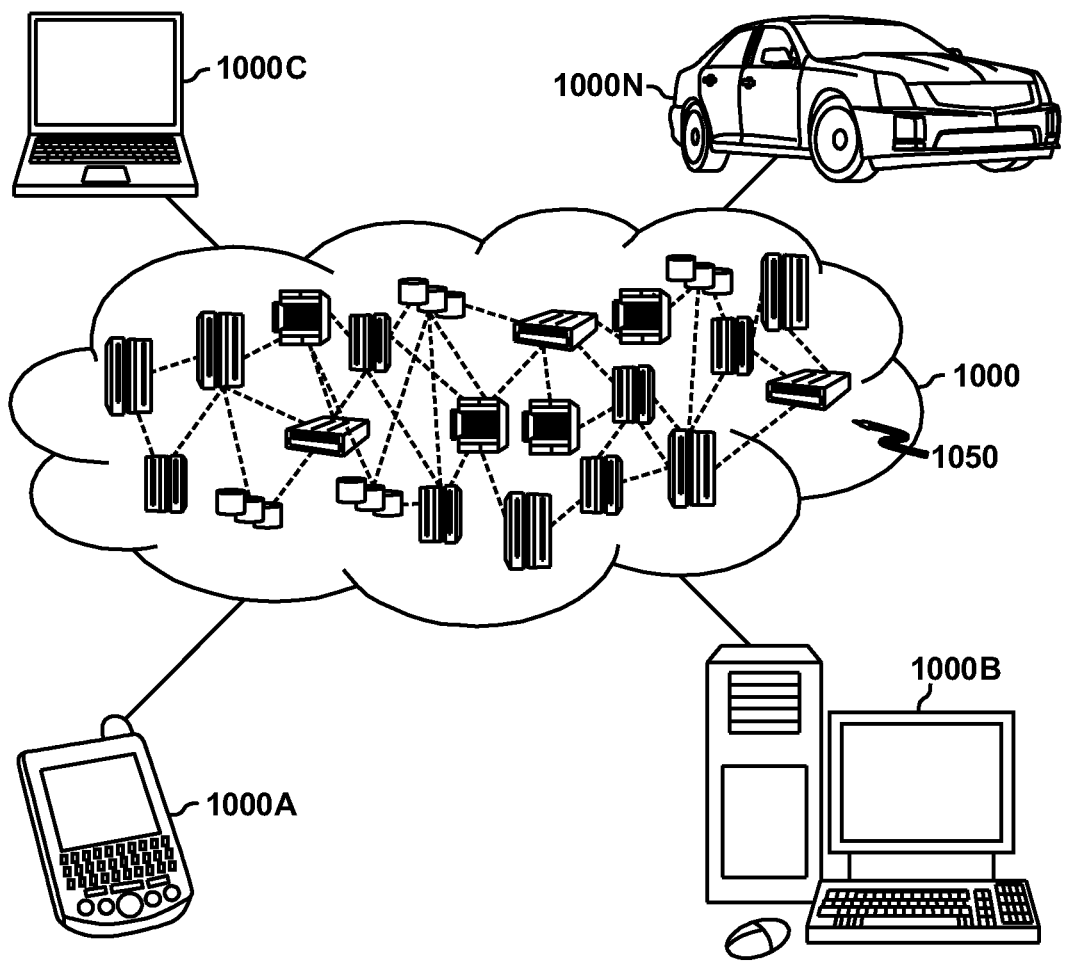
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, the cloud computing environment 1000 includes one or more cloud computing nodes 1050 with which local computing devices used by cloud consumers, such as, for example, personal digital assistant (PDA) or cellular telephone 1000A, desktop computer 1000B, laptop computer 1000C, and/or automobile computer system 1000N may communicate. Cloud computing nodes 1050 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 1050 and cloud computing environment 1000 can communicate with any type of computerized device over any type of network and/or network addressable connection (e.g., using a web browser).

Figure 6:
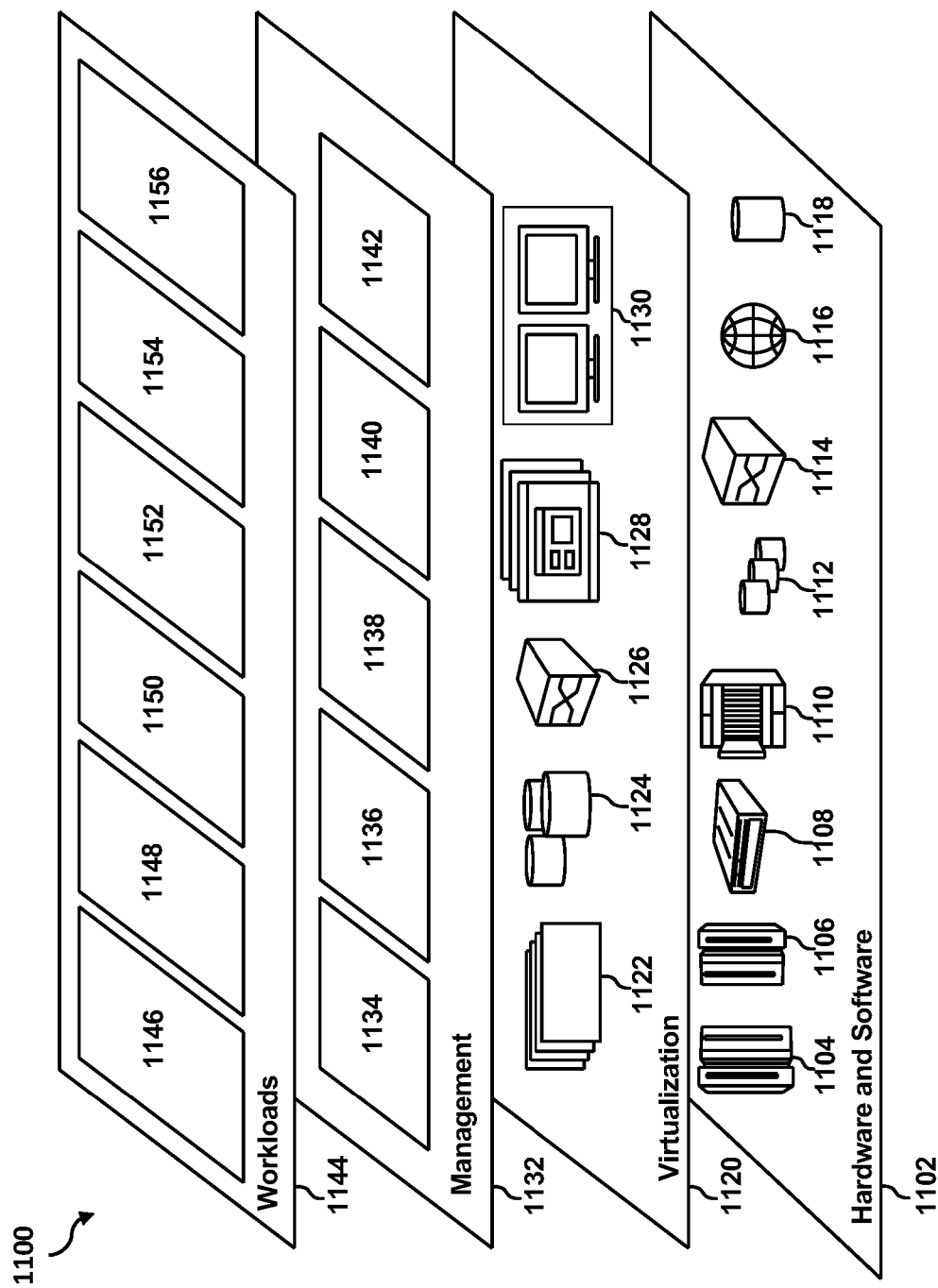
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

A hardware and software layer 1102 include hardware and software components. Examples of the hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, a management layer 1132 may provide the functions described below. Resource provisioning 1134 provides dynamic procurement of computing resources and other resources that are utilized to perform tasks within the cloud computing environment. Metering and pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions that may be provided from this layer include: mapping and navigation 1146; software development and lifecycle management 1148; virtual classroom education delivery 1150; data analytics processing 1152; transaction processing 1154; and image annotation 1156. An image annotation program 110*a*, 110*b* provides a way to obtain higher quality image training data, to trace data use on a blockchain ledger and to provide an incentivized marketplace for buying and selling image and annotation data for model training The present invention may be a system, a method, and/or a computer program product at any possible technical detail level of integration. The computer program product may include a computer readable storage media 915 (or media) having computer readable program instructions thereon for causing a processor 906 to carry out aspects of the present invention.

The computer readable storage media 915 can be a tangible device that can retain and store instructions for use by an instruction execution device. The computer readable storage media 915 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage media 915 includes the following: a portable computer diskette, a hard disk, a random access memory (RAM) 908, a read-only memory (ROM) 910, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage media 915, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage media 915 or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface 922 in each computing/processing device receives computer readable program instructions from the network and forwards the computer readable program instructions for storage in a computer readable storage media 915 within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor 906 of a general purpose computer, special purpose computer, or other programmable data processing apparatus to produce a machine, such that the instructions, which execute via the processor 906 of the computer or other programmable data processing apparatus, create means for implementing the functions/acts specified in the flowchart and/or block diagram block or blocks. These computer readable program instructions may also be stored in a computer readable storage media 915 that can direct a computer, a programmable data processing apparatus, and/or other devices to function in a particular manner, such that the computer readable storage media 915 having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
uploading images to a marketplace comprising a market that is managed by a blockchain ledger with smart contracts;
recording references to the images on the blockchain ledger;
measuring one or more annotation quality metrics of local and global annotations;
saving the local and global annotations on a cloud object storage server and encrypting the local and global annotations with a unique fingerprint;
determining that an image quality threshold has been met based on the measured one or more annotation quality metrics of the local and global annotations;
providing the one or more annotation quality metrics to the marketplace upon determining that the image quality threshold has been met;
pre-processing and standardizing the images;
training a model using the images and the local and global annotations, wherein training the model comprises using training data to assist the model in generalizing to unseen data in clinical use to both improve the training data and the model;
recording the model in the blockchain ledger, using a smart contract to connect the images and annotations to an individual;
providing the model to the marketplace; and
annotating one or more images on the marketplace to predict medical diagnostics using the trained model.

2. The method of claim 1, wherein the marketplace allows users to purchase and to sell access to the images, annotations and expert feedback.

3. The method of claim 1, wherein the references to the images on the blockchain ledger include image ownership information and accessibility information relating to the images and annotations.

4. The method of claim 1, wherein the local annotations are performed as a quality measure that considers ground truth provided by experts.

5. The method of claim 1, wherein the global annotations are performed as a quality measure for the images based on peer-to-peer comparisons.

6. The method of claim 1, wherein the one or more annotation quality metrics are measured based on marketplace feedback to improve annotations and data quality for model training purposes.

7. The method of claim 1, wherein the model is trained on a cloud object storage and the model is uploaded to a container with model training code, wherein the model executes training and testing within confines of the smart contract.

8. A computer system comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
uploading images to a marketplace comprising a market that is managed by a blockchain ledger with smart contracts;
recording references to the images on the blockchain ledger;
measuring one or more annotation quality metrics of local and global annotations;
saving the local and global annotations on a cloud object storage server and encrypting the local and global annotations with a unique fingerprint;
determining that an image quality threshold has been met based on the measured one or more annotation quality metrics of the local and global annotations;
providing the one or more annotation quality metrics to the marketplace upon determining that the image quality threshold has been met;
pre-processing and standardizing the images;
training a model using the images and the local and global annotations, wherein training the model comprises using training data to assist the model in generalizing to unseen data in clinical use to both improve the training data and the model;
recording the model in the blockchain ledger, using a smart contract to connect the images and annotations to an individual;
providing the model to the marketplace; and
annotating one or more images on the marketplace to predict medical diagnostics using the trained model.

9. The computer system of claim 8, wherein the marketplace allows users to purchase and to sell access to the images, annotations and expert feedback.

10. The computer system of claim 8, wherein the references to the images on the blockchain ledger include image ownership information and accessibility information relating to the images and annotations.

11. The computer system of claim 8, wherein the local annotations are performed as a quality measure that considers ground truth provided by experts.

12. The computer system of claim 8, wherein the global annotations are performed as a quality measure for the images based on peer-to-peer comparisons.

13. The computer system of claim 8, wherein the one or more annotation quality metrics are measured based on marketplace feedback to improve annotations and data quality for model training purposes.

14. The computer system of claim 8, wherein the model is trained on a cloud object storage and the model is uploaded to a container with model training code, wherein the model executes training and testing within confines of the smart contract.

15. A computer program product comprising:
one or more computer-readable tangible storage media and program instructions stored on at least one of the one or more computer-readable tangible storage media, the program instructions executable by a processor to cause the processor to perform a method comprising:
uploading images to a marketplace comprising a market that is managed by a blockchain ledger with smart contracts;
recording references to the images on the blockchain ledger;
measuring one or more annotation quality metrics of local and global annotations;
saving the local and global annotations on a cloud object storage server and encrypting the local and global annotations with a unique fingerprint;
determining that an image quality threshold has been met based on the measured one or more annotation quality metrics of the local and global annotations;
providing the one or more annotation quality metrics to the marketplace upon determining that the image quality threshold has been met;
pre-processing and standardizing the images;
training a model using the images and the local and global annotations, wherein training the model comprises using training data to assist the model in generalizing to unseen data in clinical use to both improve the training data and the model;
recording the model in the blockchain ledger, using a smart contract to connect the images and annotations to an individual;
providing the model to the marketplace; and
annotating one or more images on the marketplace to predict medical diagnostics using the trained model.

16. The computer program product of claim 15, wherein the marketplace allows users to purchase and to sell access to the images, annotations and expert feedback.

17. The computer program product of claim 15, wherein the references to the images on the blockchain ledger include image ownership information and accessibility information relating to the images and annotations.

18. The computer program product of claim 15, wherein the local annotations are performed as a quality measure that considers ground truth provided by experts.

19. The computer program product of claim 15, wherein the global annotations are performed as a quality measure for the images based on peer-to-peer comparisons.

20. The computer program product of claim 15, wherein the one or more annotation quality metrics are measured based on marketplace feedback to improve annotations and data quality for model training purposes.

* * * * *